Dec. 25, 1962

A. M. WENDT 3,070,120

VALVE AND SEALING GASKET THEREFOR

Filed Dec. 23, 1960

INVENTOR.
ALEX M. WENDT
BY
Christian R. Nielsen
ATTORNEY

United States Patent Office

3,070,120
Patented Dec. 25, 1962

3,070,120
VALVE AND SEALING GASKET THEREFOR
Alex M. Wendt, Houston, Tex., assignor to L-K Pump Valve Company, Houston, Tex.
Filed Dec. 23, 1960, Ser. No. 77,937
1 Claim. (Cl. 137—516.29)

This invention relates to pump valves and the like and more particularly to an elastic sealing gasket to effect a tight seal between a valve and its cooperating seat, and it consists in the constructions, arrangements and combinations herein described and claimed.

It is the cardinal object of the invention to provide an improved elastic gasket insert wherein the sealing face thereof is of diagonal or tapered formation corresponding to the tapered formation of the seat of the valve, the assembly being such that circumferential portions of the tapered portion of the gasket insert are exposed to fluid pressure, thus insuring a full and positive seat upon the valve seat.

More specifically, it is an object of the invention to provide a valve body having a circumferential tapered seat complemental to a tapered valve, the face of the valve being of such diameter and thickness as to occupy approximately one-half of the lower portion of the valve seat when fully seated; said valve body further being provided with recesses and ridges cooperating with a retaining plate for securement of an elastic gasket, the peripheral edge of the gasket being extended in a plane complemental to the plane of the valve seat and of a thickness corresponding to that portion of the valve seat not contacted by the valve face, whereby said peripheral edge of the gasket is exposed to fluid pressure when the valve is in closed position.

Additional objects, advantages and features of invention will be apparent from the following description, considered in conjunction with the accompanying drawing, wherein, FIGURE 1 is a sectional view partly in elevation, of a wing-guided valve embodying the invention, illustrating the valve in closed position.

Figure 1:
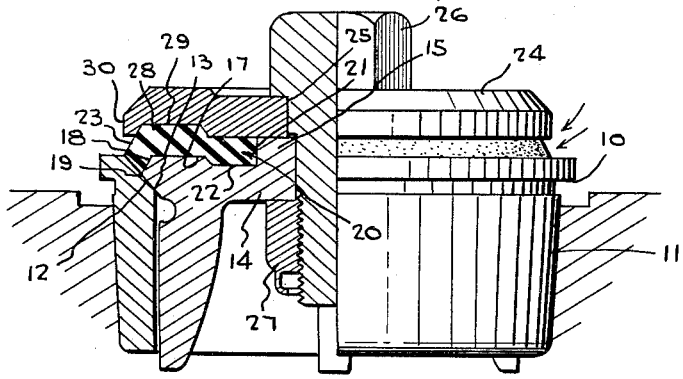
Figure 2:
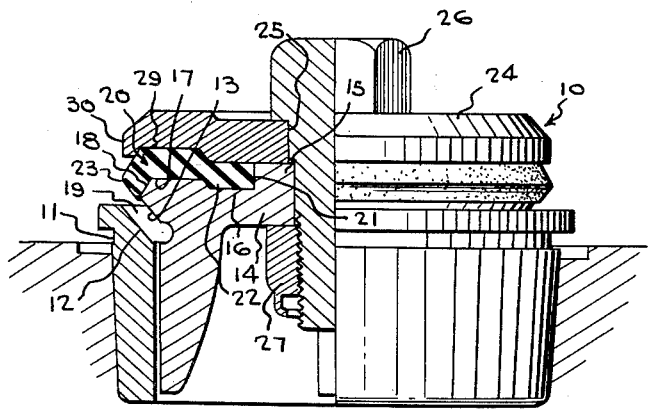
FIGURE 2 is a similar view illustrating the valve in open position.

Reference is first made to FIGURES 1 and 2 of the drawing, wherein a wing-guided valve 10 is shown which comprises a cylindrical cage 11 having a tapered valve seat 12 upon the upper face thereof and to which a valve face 13 of valve 10 is cooperable in the control of liquid under pressure.

In the present instance, the valve 10 comprises a main cylindrical body 14 having a medial hub 15 and circumscribing the hub a recess 16 is formed, which recess terminates in a vertically raised flat surface 17. The peripheral edge of the body 14 is beveled as at 18 and forms an angle at the juncture with the valve face 13 when seated thereon and as best seen in FIGURE 1 the apex 19 of the angle contacts the valve face 13 at approximately one-half of the lower surface portion of the valve face.

An annular elastic gasket 20 of substantial thickness is employed to effect a pressure seal upon the valve seat 12 which comprises an axial opening 21 of a diameter to snugly embrace the hub 15 of the valve body, and outwardly of the opening is formed with an annular offset portion 22 upon the underside of the gasket for seating engagement with the recess 16. The peripheral edge of the gasket is downwardly formed at an angle to provide a peripheral bead 23 complemental to the bevel 18 of the valve body. The surface of the gasket 20 between the flange 23 and the offset portion 22 is flat for engaging the surface 17 of the valve body.

In order that the gasket 20 will be retained in proper position upon the valve body, a retainer plate 24 is employed, and as shown is provided with an axial opening 25 through which an assembly bolt 26 may pass as well as through the opening of the hub 15, the plate 24 being drawn into assembled relation upon the gasket by means of a nut 27.

The gasket 20 is further provided with an annular raised portion 28 above the flat surface 17 of the valve body and the retainer plate 24 is formed with an annular channel 29 which embraces the raised portion 28 of the gasket. The peripheral bead 23 of the gasket is afforded rigidity by means of an overhanging annular flange 30 of the retainer plate which it will be noted is of a length to engage but a small portion of the peripheral bead 23, so that the greater portion of the bead is exposed to fluid pressure in the closed position of the valve.

Figure 3:
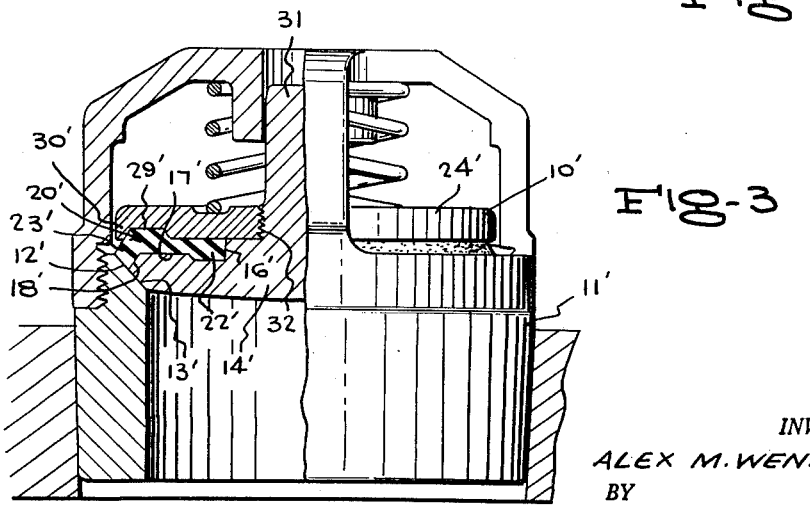
FIGURE 3 is a sectional view of a cage-guided valve embodying the invention.

In the form of valve illustrated in FIGURE 3, the parts corresponding to those shown and described in connection with FIGURES 1 and 2 are designated by primed reference characters, but in the cage-guided construction, the hub of the retainer plate 24' is interiorly threaded for engagement with threads on the valve stem 31 as indicated at 32.

The operation of the two valves illustrated is identical and it will be seen that with the valve 10 or 10' in closed position, the bead 23 or 23' will be seated against the uppermost portion of the valve seat 12 or 12' and that the flange 30 or 30' of the retainer plate engages only a small portion of the bead, thus insuring a substantial area of the beads 23 or 23' being exposed to fluid pressure to provide positive seating of the valve.

With the present construction, it has been found in actual practice, that a flexible gasket such as employed in the present embodiments of the invention will conform to the valve seat even if worn or scored and will withstand more wear than conventional hard rubber inserts which are subject to cracking or actual breakage, which of course, results in a leaking valve.

While I have shown and described preferred forms of the invention, this is by way of illustration only, and I consider as my own all such modifications in construction as fairly fall within the scope of the appended claim.

I claim:

In a device of the character described, a valve body having a tapered valve seat, a valve reciprocable in said valve body and having a valve face cooperable with a lower portion of said tapered valve seat, said valve body having a medial hub, a recess circumscribing said hub, and said recess being surrounded by a vertically raised flat surface, the outer peripheral edge of the body being beveled and being arranged angularly with respect to the valve face, the apex of the angle between the valve face and the beveled surface contacting the valve face at approximately one-half of the lower surface portion of the valve face, an elastic insert mounted on said valve, and said insert comprising an axial opening of a diameter to snugly embrace the hub of the valve body, an annular offset portion formed outwardly of the axial opening on the underside of the insert in seating engagement with the recess in the valve body, said valve including a retaining plate above said elastic insert and means for securing the retaining plate and elastic insert thereto, said elastic insert having a downwardly extended peripheral bead in contacting engagement with the bevel at the apex of said valve and said bead having a circumferential face complemental to the upper portion of said tapered valve seat, the surface of the insert between the bead and the offset portion being flat for engaging the raised flat surface of the valve body, said insert being further provided with an annular raised portion above the flat surface of the valve body, and said retainer plate being provided with an annular channel spaced from the center of the retainer plate so as to embrace the raised portion of the insert, the peripheral bead of the insert being afforded rigidity by means of an overhanging annular flange of the retainer plate which is of a length to engage but a small portion of the peripheral bead so that the greater portion of the bead is exposed to fluid pressure in the closed position of the valve.

References Cited in the file of this patent
UNITED STATES PATENTS

| | | |
|---|---|---|
| 2,178,876 | MacClatchie | Nov. 7, 1939 |
| 2,329,576 | Anderson | Sept. 14, 1943 |
| 2,521,314 | Therolf | Sept. 5, 1950 |
| 2,792,016 | Shellman et al. | May 14, 1957 |
| 2,903,235 | Rodgers | Sept. 8, 1959 |